May 9, 1967
J. R. RAY
3,318,436
BULK MATERIAL FEEDER
Filed April 8, 1966
2 Sheets-Sheet 1
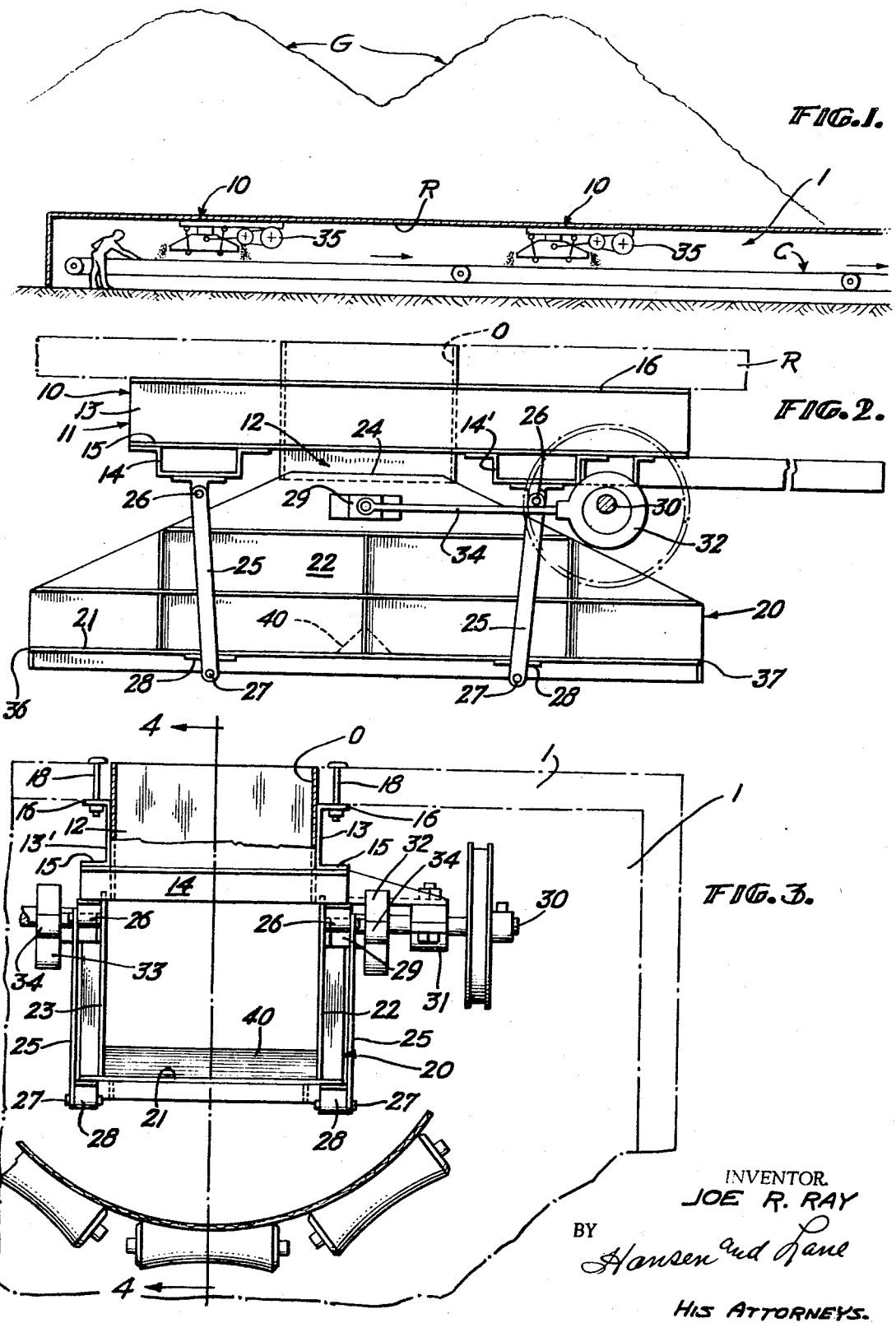
INVENTOR.
JOE R. RAY
BY Hansen and Lane
HIS ATTORNEYS.

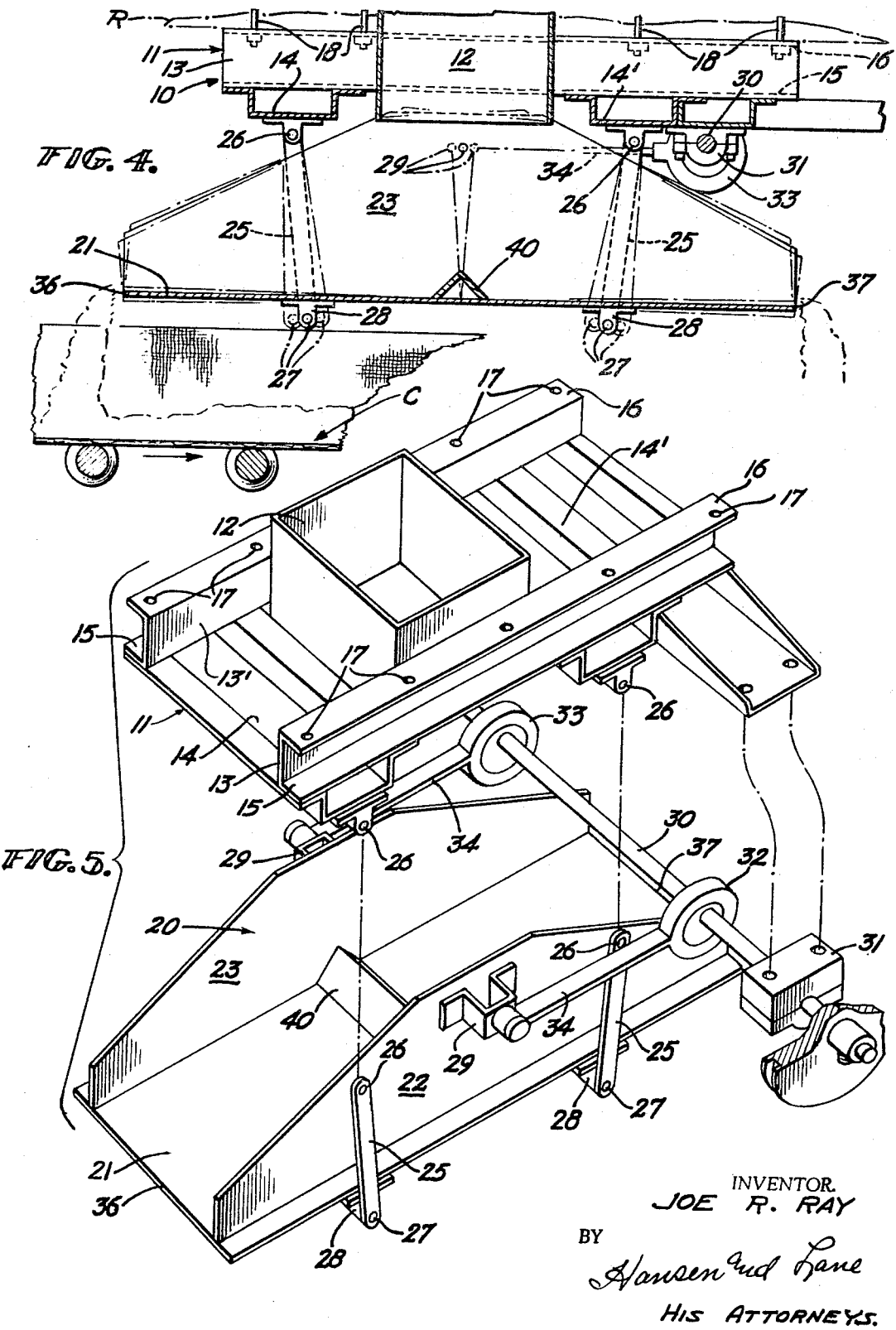

United States Patent Office 3,318,436
Patented May 9, 1967

3,318,436
BULK MATERIAL FEEDER
Joe R. Ray, 1798 Grace Ave., San Jose, Calif. 95125
Filed Apr. 8, 1966, Ser. No. 541,318
7 Claims. (Cl. 198—60)

This invention relates to bulk material feeders and more particularly to apparatus for feeding bulk, dry, solid, granular material from a promiscuous mass thereof into a conveyor, bin, hopper or the like.

The present invention is most useful in the feeding of bulk material such as sand and gravel of various screenings from a mound thereof uniformly into a conveyor for transmission to a batch plant. The material is usually stored in the open as mounds which are piled over a tunnel through which the conveyor extends. The material is allowed to fall by gravity through an opening above the conveyor. The object is to spread the falling granular material upon the conveyor as it passes the overhead opening.

Although sand and gravel is free flowing, it has a tendency to arch and become compacted when fed by gravity through a restricted opening or passage. This arching is usually broken and the material freed by adding energy to the compacted material. Such energy is usually applied by subjecting the material to vibration at the zone of discharge so as to relieve back pressure and compacting of the material at the restricted opening and/or passage.

The present invention was conceived to alleviate the problem of compacting and arching of bulk granular material at the restricted passage through which it falls and to uniformly distribute the falling material upon the conveyor as it passes beneath such restricted passage.

It is an object of the present invention to provide a bulk material feeder as a unitary structure adapted to be mounted in the ceiling of a tunnel under a standing supply of such material for feeding the latter to a conveyor running through the tunnel.

It is another object to provide a bulk material feeder constructed to provide a restrictive passage through which the bulk material can gravitate toward the conveyor and means for transmitting motion to the material at the critical point of compacting and/or arching thereof and for uniformly spreading such bulk material upon the conveyor as it moves along.

It is another object to provide a feeder and throat beneath a supply of bulk material for controlling gravity flow of such material; providing a gate for shut-off of normal flow; and for vibrating the material at the critical point of arching and compacting to induce gravitation of the material and for uniformly distributing the material onto a conveyor or within a receptacle for use in a batch plant and the like.

These and other objects and advantages of the present invention will become apparent from a reading of the following description and claims in the light of the accompanying two sheets of drawings in which:

FIG. 1 is a diagrammatic section through a stock pile of granular material and longitudinally of a conveyor tunnel to illustrate the situs of the present invention relative thereto.

FIG. 2 is an enlarged side view of one of the unitary bulk material feeders of FIG. 1.

FIG. 3 is an end view of the device of FIGS. 1 and 2 shown in relation to the tunnel and conveyor.

FIG. 4 is a longitudinal section through the device of FIGS. 2 and 3 and taken along line 4—4 of the latter.

FIG. 5 is an exploded perspective of the elements embodied in the invention as illustrated in FIGS. 1 through 4.

Referring to FIG. 1, a stockpile of granular material G is shown as several mounds developed over a tunnel T wherein a conveyor C is arranged to receive and carry such material out of the tunnel for discharge into a batch plant or the like, not shown.

The bulk material feeder of the present invention consists of a unitary structure 10 adapted to be arranged and/or or suspended from the ceiling or roof R of the tunnel T above the conveyor C. In general the structure 10 comprises a frame 11 having a throat or passage 12 formed therein and extending above the frame for projection through an opening O formed in the roof R of the tunnel T.

The frame 11 comprises a pair of channels 13–13' disposed in parallel relation by cross beams 14 and 14' secured to the lower flanges 15 of the channel members. The upper flanges 16 of the channels 13–13' have bolt holes 17 formed therethrough to receive the threaded ends of bolts 18 extending through the roof R of the tunnel adjacent the opening O therethrough. The throat 12 comprises a rectangular box-like structure, the sides of which fit between the channels 13–13' and are secured thereto in any suitable manner so that the throat structure extends above and below the channels of the frame 11. The throat 12 extends above the frame 11 substantially the thickness of the roof R of the tunnel and lines the opening O therein to provide a passage through which the granular material falls.

A shaker 20 is suspended from the frame 11 beneath the throat 12 to receive the material falling therethrough, to keep the material in motion and for distributing the material evenly upon the conveyor C. The shaker 20 comprises a tray-like structure having a solid bottom plate 21 approximately the width of the throat 12 and several times that size in length. Side walls 22 and 23 extend upwardly from the bottom plate 21 and each taper from the ends of the bottom 21 toward a narrower upper edge 24 which approximates the length of the throat 12. The side walls and bottom plate of the shaker tray 20 are suitably rigidified by reinforcing ribs and flanges as shown in FIG. 2.

The suspension of the tray 20 relative to the frame 11 as accomplished by arms 25 at four points and along the sides of the tray. As best seen in FIGS. 2, 4, and 5 one such arm 25 is pivotally connected as at 26 to the respective end of each cross arm 14 and 14' so that the arms 25 hang down clear of but along the side walls 22 and 23 of the tray 20.

The lower end of each arm 25 is pivotally connected as at 27 to a bushing 28 secured to the underside of the bottom plate 21 of the tray 20. It should here be noted that the pivotal connections 27 on the tray are equidistant from the lengthwise center of the tray and that the pivotal connections 26 at the upper ends of the arms 25 are spaced a slightly greater distance from each other than the pivotal connections 27 at the lower ends of the arms 25. In this manner the lengthwise center of the tray 20 tends to assume centered relation directly below the throat 12.

Each side wall 22 and 23 of the tray 20 has a boss 29 secured therto adjacent the upper edge 24 thereof. A drive shaft 30 is journaled for rotation in suitable bearings 31 at each side of the frame 11 (beyond the cross arm 14') to support the drive shaft 30 transversely of the frame. An eccentric is secured to the drive shaft 30, there being one such eccentric 32 and 33 at each side of the frame 11 with a connecting rod 34 between the drive shaft and the respective boss 29 on the adjacent side of the tray 20.

One end of the drive shaft 30 has powered connection with a source of motivation which may be an electric motor or self contained engine 35 (FIG. 1). Upon operation of the drive shaft 30 the eccentrics 32 and 33 are set to shift the tray 20 to and fro lengthwise or end to end. The tray 20 will swing in a fore to aft direction on the rocker arms 25 in the manner illustrated in dotted and dot-dash lines in FIG. 4. The reciprocation is ever so slight, the eccentrics having about a ¾ inch offset and the drive shaft turning from 100 to 450 r.p.m. affords a vibratory motion to the tray.

It is interesting to note that when the tray 20 is shut off (not vibratory) the granular material gravitating through the passage provided by the throat 12 stacks up and compacts in the tray 20. In other words, the side walls 22 and 23 of the tray resist gravitation of material sideways out of the tray and the length of the tray is such that the distance of the force and aft open ends 36 and 37 thereof from the throat 12 far exceeds the angle of repose of the granular material. Consequently, normal gravitation of the material is stopped, the apparatus serving as a gate or valve by which to stop the granular material from flowing from the stock pile toward the conveyor.

However, when the apparatus is turned on, the drive shaft 30 causes the eccentrics to reciprocate the connecting rods 34 to thereby rock the tray longitudinally relative to the arms 25 by which the tray is suspended from the frame 11. This causes the granular material within the tray 20 to be shifted to and fro whereby a small amount of the material is displaced from beneath the throat and caused to spill off of the tray at the fore and aft ends 36 and 37 thereof.

The vibration of the tray 20 also causes disturbance to material compacted between the throat and the tray, breaking up any arching of the material and inducing it to gravitate into the tray for movement thereby toward the open ends thereof.

As best seen in FIGS. 4 and 5 there is a transverse ridge 40 upon the bottom of the tray 20 so flared as to cause the material to be deflected toward one or the other open end thereof and to deter back flow of the material in an opposite direction along the bottom of the tray. In this connection it should be noted that the rocking motion afforded by the suspending arms 25 to the tray, in effect creates a tilting of the tray, alternately in a fore and aft direction. This is brought about by reason of the wider spread of the upper ends of the arms 25 in contrast with the disposition of the lower ends of the arms. See for example FIG. 4 wherein neither arm 25 at either end of the tray passes beyond vertical disposition relative to the pivotal connection 26 at its upper end. Moreover, note in particular that when the arms adjacent one end, say 36, reach almost vertical, the other set of arms 25 adjacent the other end 37 is at its extreme angular disposition inwardly relative to vertical. Thus it will be seen that the end 37 is slightly raised whereas the opposite end 36 is lower during the thrust stroke in that direction. The tray, in effect, drops from the material about to be discharged and the latter with some momentum, created by reciprocation of the tray, stands substantially stationary as the tray shifts away toward its opposite extreme position of reciprocation. In this manner a substantially uniform quantity of granular material spills onto the conveyor below and is distributed along the same by reason of the movement of the conveyor relative to the bulk material feeder. The material is constantly spilled alternately from each end of the tray thereby laying a proper amount of material on the conveyor as it passes along.

As best seen in FIG. 1 there may be several units 10 along the length of the conveyor C and each beneath a pile of material of a different screening or size. In this manner, an aggregate of different proportions of the granular material can be brought together automatically by the several bulk feeders 10.

While I have described my new arrangement of a bulk material feeder in specific detail it will be appreciated by those skilled in the art that the structure may be varied, altered and/or modified without departing from the spirit or scope of my invention therein. I therefore desire to avail myself of all variations, alterations, and/or modifications as may fairly come within the purview of the appended claims.

I claim:
1. A bulk material feeder for controlling gravitational flow of granular material from a mound thereof onto a conveyor; comprising
    (a) a frame supported beneath said mound of granular material,
    (b) a throat formed in said frame providing a restricted passage therethrough,
    (c) a shaker tray having side walls spaced approximately the width of said throat and open ends spaced from each other a distance slightly greater than the angle of repose of the granular material flowing through said throat,
    (d) means for pivotally suspending said shaker tray from said frame in centered relation to said throat, for shaking movement in a lengthwise direction, and
    (e) a power driven eccentric journaled on said frame having a connecting rod pivotally connected to said tray for moving said shaker tray to and fro for spilling granular material alternately from opposite ends of said shaker tray.

2. The device in accordance with claim 1 in which said means for suspending the shaker tray comprises a plurality of arms each having its lower end pivotally connected to a respective corner of said tray and each said arm having its upper end pivotally connected to said frame a greater distance from said throat than the lower ends of said arms whereby said tray assumes centered position relative to said throat.

3. The device in accordance with claim 1 in which said eccentric includes a cross shaft journaled on said frame, and a connecting rod between said eccentric and the side walls of said tray for rocking the latter to and fro for alternately spilling granular material from opposite ends of said tray.

4. A bulk material feeder for use in a tunnel under a mound of granular material for controlling gravitational flow of such material through a restricted opening in the ceiling of such tunnel and onto a conveyor by which such material is transferred out of the tunnel; said bulk material feeder comprising:
    (a) a frame secured to the ceiling of such tunnel,
    (b) a throat formed on said frame communicating with the opening in the ceiling of such tunnel for guiding granular material therethrough,
    (c) a shaker tray having side walls spaced approximately the width of said throat and open ends spaced from each other a distance slightly greater than the angle of repose of the granular material flowing through said throat,
    (d) means for suspending said shaker tray from said frame in centered relation to said throat for shaking movement in a lengthwise direction,
    (e) an eccentric journaled on said frame and pivotally connected to said tray, and
    (f) means for motivating said eccentric for moving said shaker tray to and fro for spilling granular material from the ends of said shaker tray to thereby uniformly distribute such material on the conveyor as it moves along within the tunnel.

5. The device in accordance with claim 4 in which said means for suspending the shaker tray comprises a plurality of arms each having its lower end pivotally connected to a respective corner of said tray and each said arm having its upper end pivotally connected to said frame a greater distance from said throat than the lower ends of said arms whereby said tray assumes centered position relative to said throat.

6. The device in accordance with claim 4 in which said power driven eccentric includes:
(a) a cross shaft journaled on said frame,
(b) an eccentric on each end of said cross shaft,
(c) a connecting rod pivotally connected to each of said eccentrics and having opposite ends pivotally connected to the respective adjacent side wall of said shaker tray midway the ends thereof.

7. The device in accordance with claim 4 in which said means for suspending the shaker tray comprises a plurality of arms each having its lower end pivotally connected to a respective corner of said tray and each said arm having its upper end pivotally connected to said frame a greater distance from said throat than the lower ends of said arms whereby said tray assumes centered position relative to said throat, and in which said connecting rod has its free end pivotally connected to the side wall of said tray in close proximity to said throat and midway between the ends of said tray.

References Cited by the Examiner

UNITED STATES PATENTS 3,104,038   9/1963   De Koning _____ 222—409

EVON C. BLUNK, *Primary Examiner.*

R. E. AEGERTER, *Assistant Examiner.*